United States Patent [19]
Ang

[11] Patent Number: 5,555,328
[45] Date of Patent: Sep. 10, 1996

[54] TOTAL INTERNAL REFLECTION KNIFE EDGE

[75] Inventor: Anthony Ang, Long Beach, Calif.

[73] Assignee: Xerox Corporation, Stamford, Conn.

[21] Appl. No.: 514,551

[22] Filed: Aug. 14, 1995

[51] Int. Cl.$^6$ ..................................................... G02B 6/32
[52] U.S. Cl. .................................. 385/31; 385/33; 385/47
[58] Field of Search ........................... 385/15, 31, 33, 385/35, 38, 39, 47, 48

[56] References Cited

U.S. PATENT DOCUMENTS

| | | | |
|---|---|---|---|
| 4,479,697 | 10/1984 | Kapany et al. | 385/33 |
| 4,699,453 | 10/1987 | Roberts | 385/47 |
| 4,993,796 | 2/1991 | Kapany et al. | 385/31 X |

Primary Examiner—John D. Lee
Attorney, Agent, or Firm—Fariba Rad

[57] ABSTRACT

There is disclosed a total reflection knife edge which is a transparent optical element for receiving a scanning light beam and allowing the light beam at certain locations to enter a fiber optic element or blocking the light beam at certain locations from entering the fiber optic element. The total reflection knife edge of this invention comprises a convex surface to focus the scanning light beam on a surface which is substantially perpendicular to the propagation direction of the scanning light beam. This surface allows the scanning light beam to exit the total internal reflection knife edge and enter the fiber optic element. The total reflection knife edge of this invention also has a surface which is at an angle to the propagation direction of the scanning light beam. The angled surface reflects the incoming scanning light beam back into the internal reflection knife edge to prevent the light beam from entering the fiber optic element.

1 Claim, 3 Drawing Sheets

FIG. 5
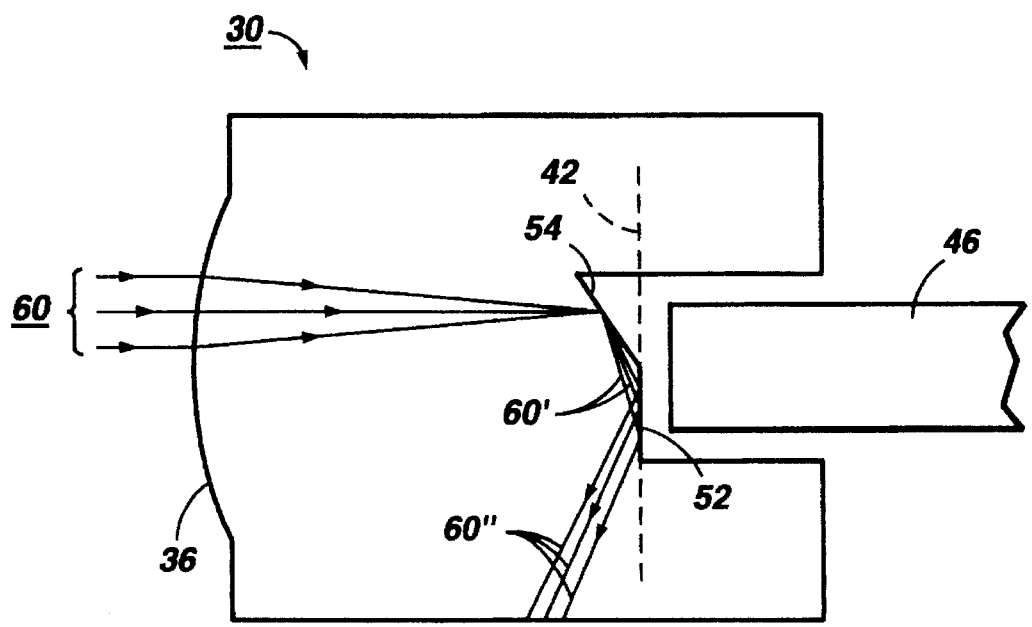
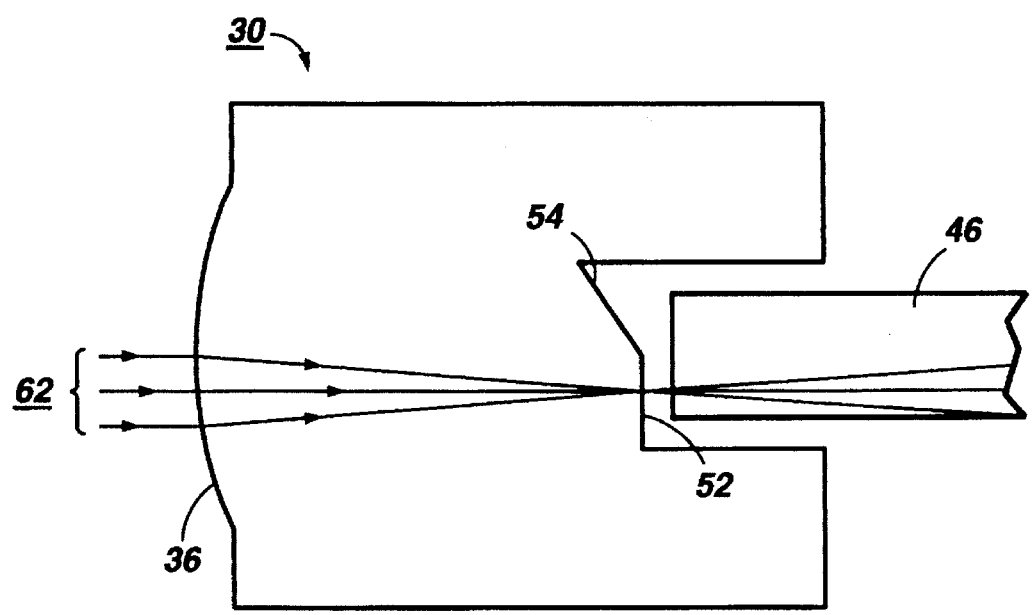
FIG. 6

TOTAL INTERNAL REFLECTION KNIFE EDGE

BACKGROUND OF THE INVENTION

This invention relates generally to a total internal reflection knife edge utilized in a raster output scanning system to improve the accuracy of the start of scan detection and more particularly, to a transparent optical element which is used as a knife edge to reflect a light beam at certain locations.

Typically, a fiber optic element is used to detect the start of scan in order to trigger the electronics to send the video stream at a precise time which corresponds to a precise location for the light exposure on a desired media. This is achieved by placing the entrance surface of a fiber optic element in the path of the scanning light beam. When the light beam passes the entrance surface of a fiber optic element, the light beam enters the fiber optic element and it is transferred to the detecting circuit. In response to the detection of the light beam, the detecting circuit generates a start of the scan pulse. In this method, in order to block the light beam from entering the fiber optic at certain locations a knife edge is used. Blocking the light beam from certain locations improves the accuracy of the detection of the start of scan.

For example, referring to FIG. 1, there is shown a prior art optical system 10 which utilizes a knife edge 12 to block a light beam 14 (shown by dashed lines) and to allow the light beam 16 (shown by the solid lines) to enter a fiber optic element 18. In FIG. 1 since the light beam is scanning a scan line, at each given time, it has a different position such as spot S and spot S'. Spot S is the source of the light for the light beam 16 and spot S' is the source of the light for the light beam 14. Therefore, if spot S is at the start of the scan, then spot S' is slightly away from the start of the scan. In this case, if the knife edge 12 does not exist, both light beams 14 and 16 from the spots S' and S respectively will enter the fiber optic element 18 and therefore, the detection of the start of the scan will not be accurate.

The knife edge 12 is placed prior to the entrance surface 19 of the fiber optic element 18 in order to block the light beam 14 and allow the light beam 16 to enter the fiber optic element 18. It should be noted that between spot S and S' there are infinite infinitesimal position changes of the spot S. However, the knife edge 12 blocks the light beam from a certain number of locations to reduce the inaccuracy in the detection of the start of scan.

Typically, in order to block the light beam from entering the fiber optic element, a layer of reflective material is applied to the knife edge 12 on the surface which receives a light beam. The reflective material causes the knife edge to reflect back the received light beam. An alternative is to build the knife edge with a light absorbing material.

It should be noted that in order to direct the scanning light beam from a light source onto a fiber optic, certain optical elements such as a mirror might be used. However in FIG. 1, for the purpose of simplicity, those elements are not shown.

In addition, in the optical system 10 of the prior art, the knife edge is placed at a distance d from the light source S in order to focus a converging light beam on the knife edge. However, referring to FIG. 2, in order to reduce the distance between the light source S and the knife edge 12 a focusing lens 20 can be placed between the light source and the knife edge 12.

It is an object of this invention to provide a transparent optical element which perform as a focusing lens and a knife edge.

SUMMARY OF THE INVENTION

In accordance with the present invention, a total internal reflection knife edge is disclosed which is a transparent optical element capable of receiving a moving light beam and allowing the light beam at certain locations to enter a fiber optic element and at other locations reflecting back the light beam away from the fiber optic element by total internal reflection. Since, the knife edge of this invention is transparent, it is designed to have a surface which has an angle with respect to the propagation direction of the light beam. Due to the angled surface and the index of refraction of the material used for the total internal reflection knife edge the light beam striking the angled surface will be reflected back and away from the entrance surface of the fiber optic element. The total internal reflection knife edge of this invention, also has a surface which is substantially perpendicular to the propagation direction of the light traveling within the total internal reflection knife edge. This surface allows the light beam to enter the fiber optic element.

BRIEF DESCRIPTION OF THE DRAWINGS

FIG. 5 shows a total internal reflection knife edge of this invention in operation when a light beam is being reflected back; and FIG. 6 shows a total internal reflection knife edge of this invention in operation when a light beam crosses the total internal reflection knife edge and enters a fiber optic element.

DESCRIPTION OF THE PREFERRED EMBODIMENT

Figure 1:
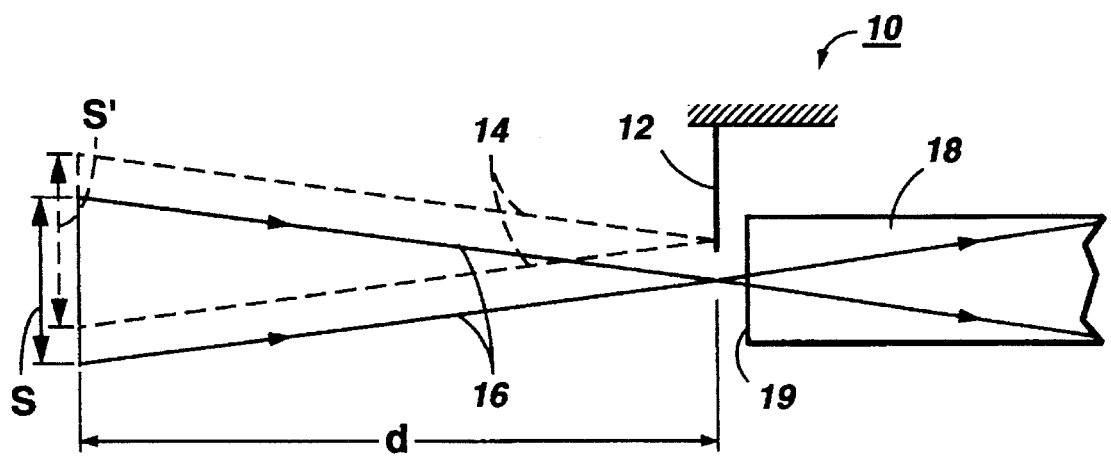
FIG. 1 shows a prior art optical system which utilizes a knife edge to block a light beam at certain locations.
Figure 2:
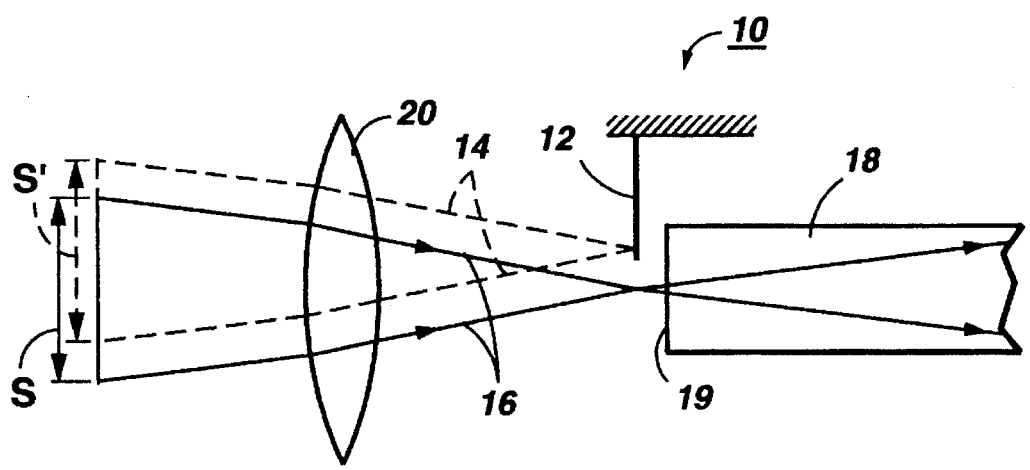
FIG. 2 shows a prior art optical system which utilizes a focusing lens and a knife edge to block a light beam at certain locations.
Figure 3:
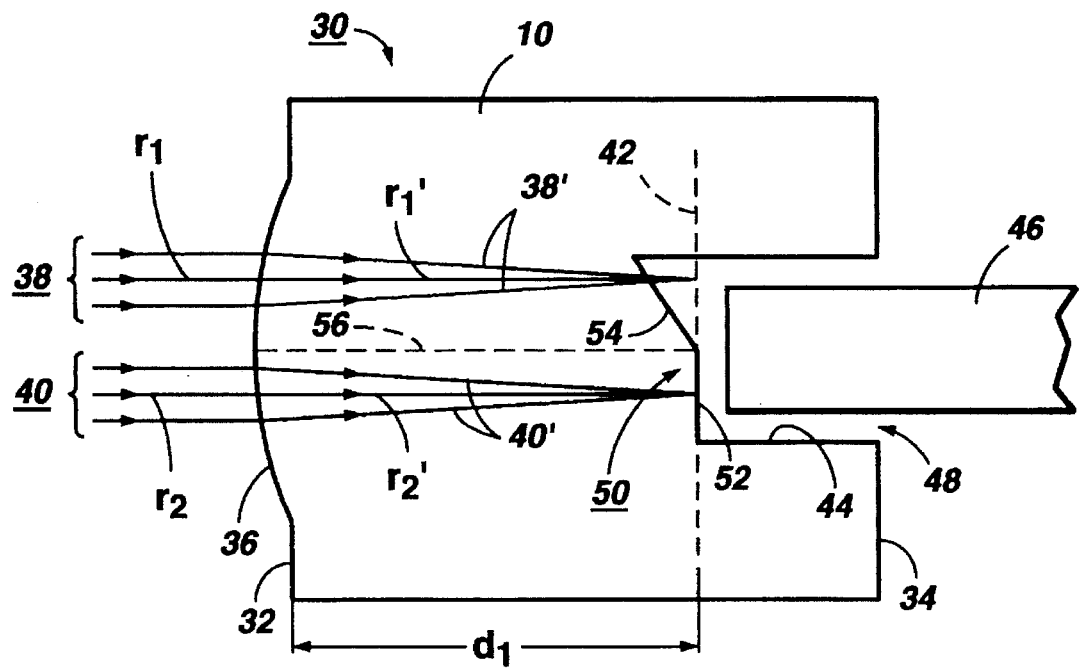
FIG. 3 shows a total internal reflection knife edge of this invention with a moving light beam at two locations and their focal plane within the total internal reflection knife edge.

Referring to FIG. 3, there is shown a total internal reflection knife edge 30 of this invention. Hereinafter, for the purpose of simplicity, the "total internal reflection knife edge 30" will be referred to as "element 30". Element 30 which is made of a transparent material, such as plastic, has a beam entrance surface 32 and a beam exit surface 34.

Beam entrance surface 32 has a convex surface 36 which creates a focusing lens. Therefore, if two light beams such as 38 and 40 which their center rays r1 and r2 respectively are substantially parallel to each other, strike and cross the surface 36, the center rays r1' and r2' of the light beams 38' and 40' traveling within the element 30 will substantially stay parallel. Both beams 38' and 40' will substantially focus on plane 42.

Element 30 also has a hollow cylinder 44 to receive a fiber optic element 46. The hollow cylinder 44 starts from the beam exit surface 34 and extends into element 30 toward the beam entrance surface 32 and terminates prior to the beam entrance surface 32. The hollow cylinder 44 has an open end 48 at the exit surface 34 for receiving the fiber optic element 46 and a closed end 50. The closed end 50 of the hollow cylinder 44 is designed to have two surfaces 52 and 54. Surface 52 which is located on plane 42 is substantially perpendicular to the direction 56 of the light beams.

It should be noted that since the light beam is a moving light beam, direction 56 shows the propagation direction of a light beam, but not the moving direction. Direction 56 is the direction which is substantially parallel to the center ray of the light beam at each location such as center rays r1' and r2'. In a raster scanning system, surface 52 will be placed to be substantially perpendicular to the direction 56 of the light beam.

It should also be noted that hereinafter when referring to an incoming light beam, it should be assumed that the light beam has a propagation direction substantially parallel to direction 56.

Figure 4:
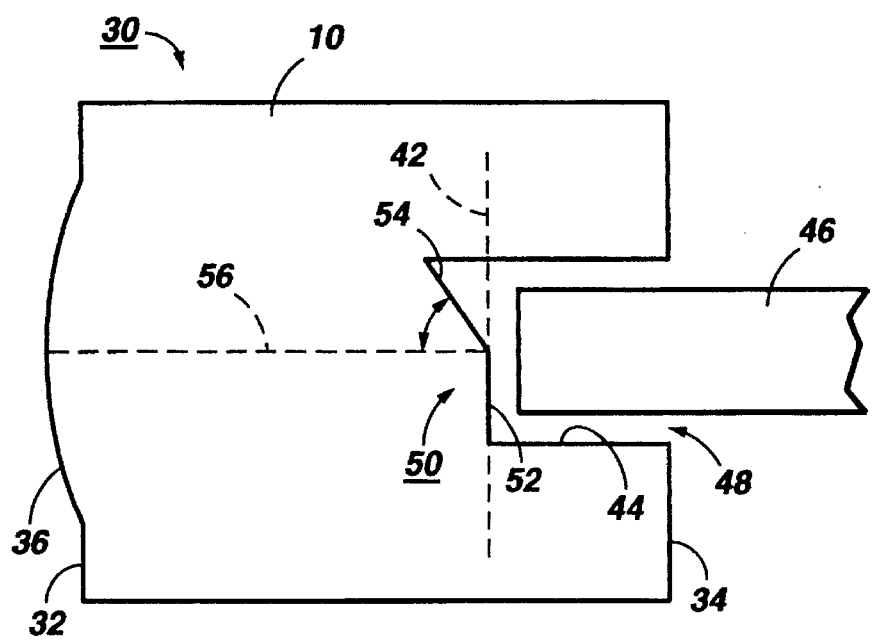
FIG. 4 shows a total internal reflection knife edge of this invention and the angle between surface 54 and the propagation direction of a light beam.

Referring to FIG. 4, surface 54 of the closed end 50 is designed to have an angle with the direction 56 of the light beam. The angle α is in such a manner that causes the surface 54 to point away from the hollow cylinder 44 and extend into element 30 toward the beam entrance surface 32.

Referring to FIG. 5, in operation, when a light beam 60 strikes the convex surface 36 of the element 30, the convex surface 36 causes the light beam 60 entering the element 30 to converge and substantially focus on plan 42 which is the plane of surface 52. Depending on the location of the light beam 60, the light beam 60 might be reflected by surface 54 or might be allowed to enter the fiber optic element by surface 52.

As it is shown in FIG. 5, if the location of the light beam 60 is in such a manner that the light beam 60 strikes the surface 54 of the closed end 50, then the light beam 60 will be reflected back. The index of refraction of the element 30 along with the angle x (FIG. 4) of the surface 54 causes any light beam coming from the convex surface 36 and striking surface 54 to be reflected back into the element 30. The reflected light beam 60' will strike the surface 52 at an angle which will cause the reflected light beam 60' to be reflected for the second time by surface 52. The reflected light beam 60" from surface 52 moves in a direction away from the hollow cylinder 44 and therefore away from the fiber optic element 46.

Referring back to FIG. 4, the angle α depends on the index of refraction of each material. For example, the preferred embodiment of this invention utilizes polycarbonate plastic which has an index of refraction of approximately 1.6. With this kind of plastic, the optimum angle (α) is substantially 30°. However, for different materials with different index of refraction, the angle α will have a different value. In summary, based on the index of refraction of each material, the angle α should be selected in such a manner to reflect all the incoming light beams from surface 36 which have a direction substantially parallel to direction 56.

It should be noted that some light beams which do not have a direction parallel to direction 56 might be reflected back by surface 54. The reflection of these light beams depends on the angle of incidence of these light beams and the index of refraction of the material of element 30. However, in the embodiment of this invention, the emphasis is on the scanning light beam which has a propagation direction substantially parallel to direction 56.

Referring to FIG. 6, if the location of the light beam 62 coming from the convex surface 36 is in such a manner that the light beam 62 strikes surface 52, the light beam 62 will enter the hollow cylinder 44 and therefore enter the fiber optic element 46.

It should be noted that some light beams which do not have a direction parallel to direction 56 might pass surface 52. The passage of these light beams through surface 52 depends on the angle of incidence of these light beams and the index of refraction of the material of element 30. However, in the embodiment of this invention, the emphasis is on the scanning light beam which has a propagation direction substantially parallel to direction 56.

Referring back to FIG. 3, depending on the desired distance $d_1$ between the surface 52 and the beam entrance surface 32, the convex surface 36 can be selected in such a manner to focus the light beam at plane 42 at a desired distance $d_1$. Therefore once the plane 42 is designed to be at the desired distance $d_1$, then surface 52 can be placed on the plane 42.

The disclosed embodiment of this invention eliminates the need for a reflective coating needed to be applied to a conventional knife edge on the surface which receives a light beam.

I claim:

1. A total internal reflection knife edge comprising:

a transparent means for receiving a scanning light beam;

said transparent means having a beam entrance end and a beam exit end;

said transparent means having an opening at the beam exit end for receiving a fiber optic element;

said opening being open at the beam exit end and terminating at a closed end intermediate the beam entrance end and the beam exit end;

a portion of said closed end having a surface being so constructed and arranged to reflect the scanning light beam striking said surface;

another portion of said closed end having a surface being so constructed and arranged to allow the scanning light beam striking said surface of said another portion to pass through said surface of said another portion and enter the fiber optic element in said opening; and said beam entrance end including a convex surface so constructed and arranged to individually focus each scanning light beam entering said convex surface on said surface of said another portion.

* * * * *